Dec. 17, 1935.  D. TEATINI  2,024,955
FILTERING APPARATUS
Filed July 8, 1933  2 Sheets-Sheet 1

Inventor
Dario Teatini
by Mawhinney & Mawhinney
Attorneys

Dec. 17, 1935.  D. TEATINI  2,024,955
FILTERING APPARATUS
Filed July 8, 1933  2 Sheets-Sheet 2

Inventor
Dario Teatini
by Mawhinney & Mawhinney
Attorneys

Patented Dec. 17, 1935

2,024,955

UNITED STATES PATENT OFFICE 2,024,955

FILTERING APPARATUS

Dario Teatini, Hougaerde, Belgium

Application July 8, 1933, Serial No. 679,570
In Belgium July 12, 1932

6 Claims. (Cl. 210—188)

It is known that the passage of liquid of a given nature through a layer of given thickness and physical constitution theoretically obeys Poiseuille's equation for the law governing the flow of a liquid in capillary vessels:

$$V = \frac{M\pi R^4 PN}{8s} \frac{1}{L} \quad \text{(1)}$$

where
$V$ = volume of liquid flowing through unit of surface in unit time,
$R$ = radius of a capillary tube,
$L$ = length of a capillary tube,
$P = p_1 - p_2$ = pressure causing the flow,
$s$ = viscosity of the liquid,
$N$ = number of capillaries per unit surfaces,
$M$ = coefficient variable with the nature of the filtering surface and the type of filter.

When a liquid containing a fairly high percentage of impurities has to be filtered, a layer of solid matter is deposited on the filtering surface the thickness of which layer is zero at the commencement of flow ($L = 0$) and increases in proportion to the volume of liquid filtered until it attains a thickness at which, for a constant pressure P, the loss of pressure due to the length L of the capillary vessels is such that delivery becomes too slow, for practical purposes thus necessitating the emptying of the filter.

Referring to the graph shown in Figure 1, if we superpose on one and the same diagram the curve A B which shows the variation of the delivery V as a function of the length L of the capillary tubes, and the curve C D which shows the variation in thickness of the solid layer during one operation of filtration, passing from minimum L to maximum L, we obtain the curves shown in Figure 1.

It will be appreciated at once that the curve A B tends to become asymptotic to the axis of the abscissæ, which demonstrates that, for a given liquid and a deposit of given nature, there exists a solid layer (cake) beyond which the delivery becomes practically negligible for a given working pressure P.

On closely examining the Equation (1) it will be seen that, of all the variables which appear in it, and for a liquid and cake of given nature, there is, industrially speaking, and without employing a suitable agent adapted to facilitate filtration, only the pressure P and the thickness L of the filter cake which may be modified, since the radius R of the capillaries, the number N of the capillaries and the viscosity $s$ of the liquid are values inherent to the nature of the particular liquid and filter cake, and the coefficient M is inherent to the type of filter and to the type of cloth or other filtering medium employed in the filter.

The maximum value, which may be assigned to the pressure P, is limited not only by the specific resistance of the filter cloth or any filtering medium, but also by the physical nature of the cake produced by the filtration, thus in certain cases commencing from a certain limit the passage offered by the cake to the liquid may become greater as the increasing pressure, reduces the radius R of the capillaries.

Furthermore, the pressure P is limited by the mechanical resistance of the filter itself.

Finally, an increase in the pressure P involves an increase in expenditure of energy which is not always permissible and is never economical.

Hence, apart from the nature of the product filtered, the thickness L of the filter cake is the only value which can be varied industrially when liquids which are relatively difficult to filter have to be treated.

In certain cases, however, the mere reduction in the thickness L may not be sufficient to give a given type of industrial filter with a sufficient filtering power, because the thickness of the filter cake L only appears in the first power in the Equation (1), whereas the radius R of the capillaries appears in the fourth power. It is necessary in such cases, therefore, simultaneously to diminish the thickness L and to increase the filtering surface of a filter of given dimensions, and in some cases even to resort to a suitable agent adapted to facilitate filtration.

The object of the present invention is to modify the construction of filter presses working under pressure or suction, in such a way as to reduce the thickness of the press-cake below that at present employed while at the same time keeping it uniform.

For this purpose the plane perforated sheet of metal which normally serves to support the filter cloth or other filtering medium is given a corrugated form, to which the filter cloth or other filtering medium conforms. The corrugations thus formed by the perforated plate and the filter medium result in an increase in the area of the filtering surface.

The present invention accordingly comprises a filter-press unit which consists of a pair of perforated plates provided on their inner surfaces with corrugations or with permeable supports laid on said surfaces and constituting corrugations, the corrugations of the two plates being in register and the plates being spaced a uniform distance apart and constituting opposite walls of a chamber into which the liquid to be filtered is introduced, a filter cloth supported on the inner surface of each plate and conforming to the corrugations of said plate, the distance between the plates being such that when the filter press is employed for the filtration of any particular liquid under a definite pressure the chamber becomes filled with removed solid before the rate of filtration is reduced below practical limits.

The invention also includes the case in which the perforated metal supports are plane, as is usual in known filter presses, but in which the cloth or other filtering medium is given a corrugated or pleated form with the aid of interposed corrugated supports.

The invention further includes means for securing tight joints between adjacent frames.

In order to make the invention clearer and more easily carried into effect it will be described with reference to the accompanying drawings in which—

Figure 1:
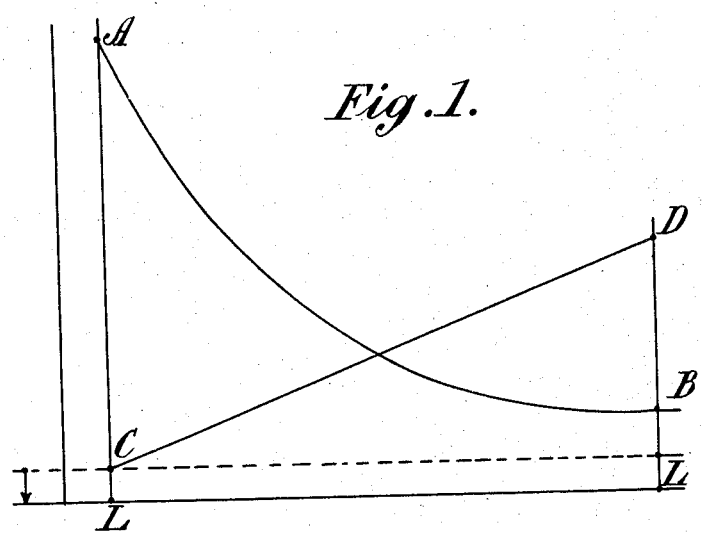
Figure 2:
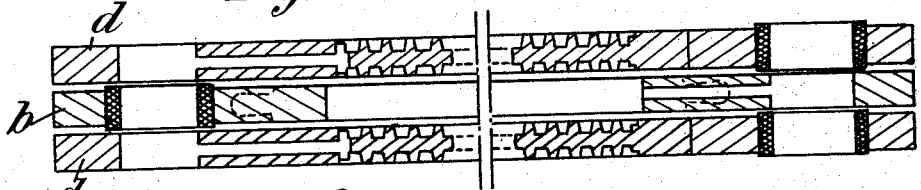
Figure 2 is a partial horizontal section of a filter press unit of known type.
Figure 3:
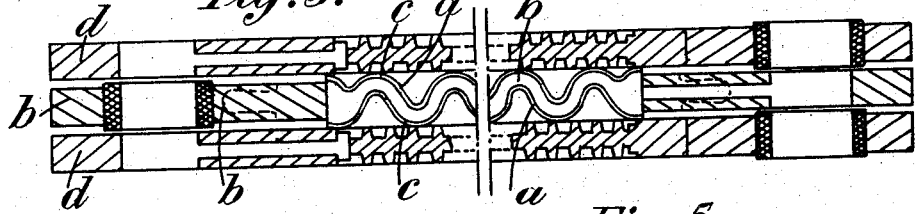
Figure 3 is a corresponding section of a filter press unit modified in accordance with the present invention.

Referring to Figure 2, the liquid to be filtered is admitted by way of conduit $n$ between the plane perforated supporting plates $a$ with their filter cloth $c$. According to the present invention, however, the filter cloth $c$ and the perforated supporting plates $a$ are given a corrugated or pleated form, as indicated in Figure 3, such that the thickness of the press cake $l$ which is formed between the filter cloths $c$ supported by the corrugated plates $a$ is less than the thickness of the frame $b$ which carries the filter cloths and their supports, and the distance between the corrugated plates remains uniform throughout the length of the elements, with the exception of the widened ends for fixing the cloths and their supports. The distance between the filter cloths will be determined by the nature of the liquid to be filtered and of the press cake.

The depth of the corrugations of the perforated supports $a$ and the filter cloths $c$ will be equal to the width of the chambers formed by the frames $b$, and thus by using for example frames of the type represented in Figure 2 a considerably increased filtering surface is obtained.

If it is assumed that the frames $b$ and the plates $d$ of the filter press unit shown in Figure 2 are 800 mm.×800 mm. and the width of the chamber formed by the frames is about 25 mm. the relationship between the filtering surface of one frame and the thickness of the press cake will be:

$$\frac{80 \times 80 \times 2}{2.5} = 5{,}120$$

If it is assumed that in the frame shown in Figure 3 the thickness of the press cake formed between the corrugated plates $a$ with the filter cloth $c$ has been reduced to 10 mm. and the width of cloth required to fit the corrugations closely is of the order of 106 cm. the relationship between the filtering surface of one frame and the thickness of the press cake becomes equal to $$\frac{80 \times 106 \times 2}{1.0} = 16{,}960$$

or in other words $$\frac{16960}{5120} = 3.31$$

times as great as that for the normal filter press.

Figure 4:
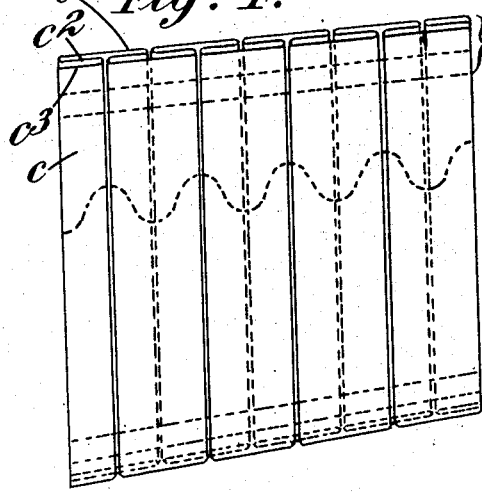
Figure 4 is a diagrammatic view in elevation showing one way of folding the filter cloth when used in accordance with the present invention.

Figure 4 of the drawings shows diagrammatically the application of the cloth to the corrugated plate indicated in dotted lines. It is obvious that the surface of the corrugated plates depends upon the width of the frame $b$. If this surface is equal to three times the said width, that is to say, to the space in which the perforated corrugated plate is lodged, the cloth which covers it will likewise have a length three times that it would have had if the perforated plate had been plane. This cloth $c$ will therefore form pleats fitting closely the corrugations of the plate $a$, but beyond the joint indicated by $f$, between the frame $b$ and the plates $d$, the cloth will be folded on itself as shown in Figure 4. Beyond the joint $f$, therefore, there will be a triple thickness $c^1$, $c^2$, $c^3$ of the cloth sewn together. Between the upper seam at $f$ and a corresponding seam at the bottom of the cloth, the cloth will fit the corrugations of the plate or sheet closely. A fluid-tight joint at the top and bottom edges will be ensured by means of the triple thickness of cloth.

Figure 5:
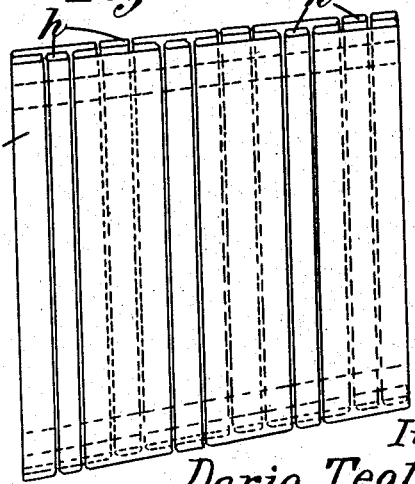
Figure 5 is a diagrammatic view in elevation of another method of folding the filter cloth.

If the cloth is not long enough to obtain a triple joint, a fold or loop $h$ should be inserted between the pleats, and this fold as shown in the drawings should not exceed the height of the joint $f$ (Figure 5). A similar result may be obtained by use of a specially woven filter cloth and this is to be preferred.

Figure 6:
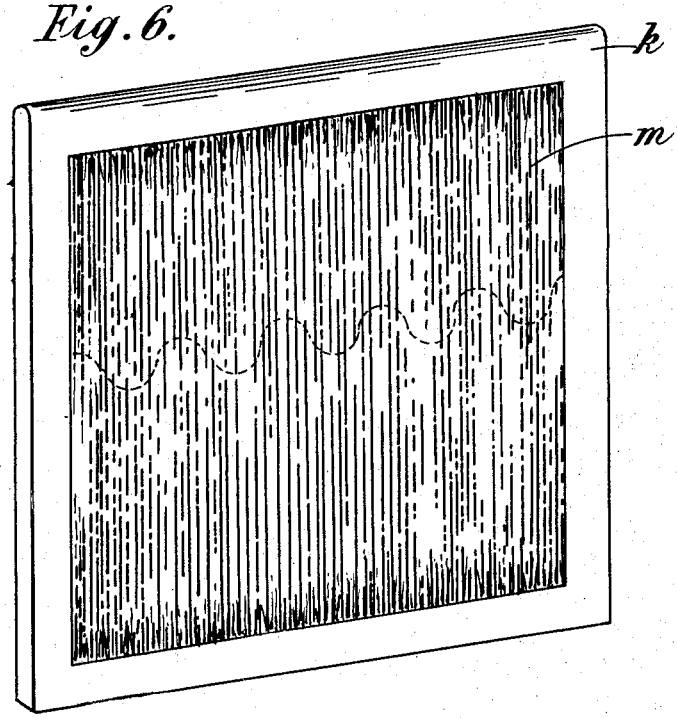
Figure 6 is a perspective view of a corrugated filter cloth surrounded by a plane edge and arranged to be gripped between adjacent frames of a filter press.

The cloth may also be arranged as shown in Figure 6, that is to say by making an edging of material of such a size as to constitute a joint between the frames and plates of a filter press as at $k$, and sewing or weaving in the interior of this edging at the top and bottom thereof, a gathered or puckered cloth $m$, the development of which is equal in length to the development of the undulations of its corrugated supporting plate. Finally, in some cases an ordinary rectangular cloth may be employed, which when under pressure in the filter press conforms to the undulations of the corrugated supports.

Instead of replacing the flat perforated metal sheet of an existing filter press by a corrugated perforated metal sheet as described above, it is possible to retain the flat metal sheet and to employ in conjunction therewith filtering cloths supported by corrugated plates as already described.

Figure 7:
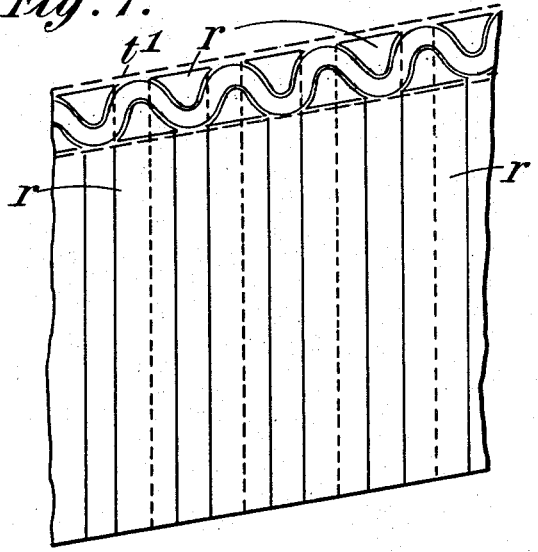
Figure 7 is a perspective view showing the method of mounting a corrugated filter cloth on a plane perforated plate.

Figures 3 to 5 show devices, in which the plane perforated plate of the ordinary filter-press has been replaced by a corrugated perforated plate, against which the filtering cloth is applied. Figure 7 shows a filter press unit in which the plane plates $t$ are retained and in which the corrugations are imparted to the cloth by the provision of supports r of sheet metal or wire. These supports r take the place of the corrugated perforated metal sheets shown for example in Figure 3.

Figure 8:
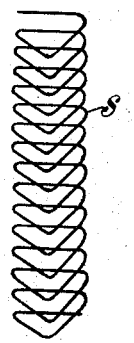
Figure 8 is a view in elevation of a wire or similar support used for producing the corrugations of the filter cloth in the case of the filter shown in Figure 7.

The supports may be constituted by a wire s rolled into a helix of an appropriate section as shown in Figure 8.

I claim:—

1. A filter press unit which comprises a pair of perforated plates each provided on its inner surface with a series of permeable supports to constitute corrugations and each member of the series consisting of a wire helix of approximately triangular cross-section, the said corrugations on the two plates being in register and the plates being spaced a uniform distance apart and constituting opposite walls of a chamber into which the liquid to be filtered is introduced, a textile filter medium supported on the inner surface of each plate and conforming to the corrugations of said plate, the distance between the plates being such that when the filter press is employed for the filtration of any particular liquid under a definite pressure the chamber becomes filled with removed solid before the rate of filtration is reduced below practical limits.

2. A filter press unit which comprises a pair of perforated plates each provided on its inner surface with a series of permeable supports to constitute corrugations and each member of the series consisting of a wire helix of approximately triangular cross-section, the said corrugations on the two plates being in register and the plates being spaced a uniform distance apart and constituting opposite walls of a chamber into which the liquid to be filtered is introduced and a textile filter medium supported on the inner surface of each plate and conforming to the corrugations of said plate.

3. A filter press unit which comprises a pair of perforated plates each provided on its inner surface with a series of permeable supports to constitute corrugations and each member of the series consisting of a wire helix of approximately triangular cross-section, the said corrugations on the two plates being in register and the plates being spaced a uniform distance apart and constituting opposite walls of a chamber into which the liquid to be filtered is introduced, a filter cloth supported on the inner surface of each plate and conforming to the corrugations of said plate, the distance between the plates being such that when the filter press is employed for the filtration of any particular liquid under a definite pressure the chamber becomes filled with removed solid before the rate of filtration is reduced below practical limits.

4. A filter press unit which comprises a pair of perforated plates each having a corrugated center portion and a plain edge portion, the corrugations on the said plates being in register and the plates being spaced a uniform distance apart and constituting opposite walls of a chamber into which the liquid to be filtered is introduced, a filter cloth supported on the inner surface of each plate, said filter cloth conforming to the corrugations of said plate and at those edges of the filter cloth perpendicular to the axes of the corrugations being folded in pleats to form a pleated edge of uniform thickness.

5. A filter press unit which comprises a pair of perforated plates each having a corrugated center portion and a plain edge portion, the corrugations on the said plates being in register and the plates being spaced a uniform distance apart and constituting opposite walls of a chamber into which the liquid to be filtered is introduced, a filter cloth supported on the inner surface of each plate, said filter cloth conforming to the corrugations of said plate and at those edges of the filter cloth perpendicular to the axes of the corrugations being folded in a series of reversed pleats to obtain at the edge of the cloth a uniform triple thickness of material.

6. A filter press unit which comprises a pair of perforated plates each having a corrugated center portion and a plain edge portion, the corrugations on the said plates being in register and the plates being spaced a uniform distance apart and constituting opposite walls of a chamber into which the liquid to be filtered is introduced, a filter cloth supported on the inner surface of each plate, said filter cloth conforming to the corrugations of said plate and at those edges of the filter cloth perpendicular to the axes of the corrugations being folded in a series of reversed pleats, inserts of double thickness fabric being placed between facing edges of adjacent pleats to obtain at the edge of the cloth a uniform thickness of material.

DARIO TEATINI.